United States Patent
Mayer et al.

(10) Patent No.: US 9,860,131 B2
(45) Date of Patent: Jan. 2, 2018

(54) SYSTEM AND METHOD FOR POLICY-BASED GEOLOCATION SERVICES FOR VIRTUAL SERVERS

(71) Applicant: International Business Machines Corporation, Armonk, NY (US)

(72) Inventors: Stefan Mayer, Gundelfingen (DE); Erik Rueger, Ockenheim (DE); Tim U. Scheideler, Schoenenberg (CH); Thomas A. Snellgrove, Wakefield, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/989,835

(22) Filed: Jan. 7, 2016

(65) Prior Publication Data
US 2017/0201421 A1   Jul. 13, 2017

(51) Int. Cl.
*G06F 15/177*   (2006.01)
*H04L 12/24*   (2006.01)

(52) U.S. Cl.
CPC ........ *H04L 41/0893* (2013.01); *H04L 41/142* (2013.01)

(58) Field of Classification Search
CPC ........... G06F 2009/4557; G06F 3/0647; G06F 9/45558; G06F 9/5077; G06F 9/5088; H04L 41/0893; H04L 41/142
See application file for complete search history.

(56) References Cited

U.S. PATENT DOCUMENTS

| 7,406,484 B1* | 7/2008 | Srinivasan ........ G06F 17/30067 |
| 8,676,593 B2 | 3/2014 | Nagpal |
| 2005/0041584 A1* | 2/2005 | Lau ...................... H04L 41/0866 370/235 |

(Continued)

FOREIGN PATENT DOCUMENTS

JP   2011248616   8/2011

OTHER PUBLICATIONS

Resource-Aware Management for IBM OpenStack Clouds with IBM Platform Resource Scheduler; IBM Platform Computing; Apr. 27, 2015; http://www-03.ibm.com/systems/platformcomputing/products/rs/index.html.

(Continued)

*Primary Examiner* — Christopher Biagini
(74) *Attorney, Agent, or Firm* — George R. McGuire; Bond Schoeneck & King, PLLC; John Pivnichny

(57) ABSTRACT

A method for automated policy-based localization of one or more virtual servers within a distributed network comprising a plurality of data centers includes the steps of: (i) receiving a policy, the policy defining at least one rule regarding localization of a virtual server within the network; (ii) storing the defined policy in a policy database; (iii) calculating, using a policy engine and the defined policy, a current policy score for a virtual server within the distributed network; (iv) optimizing, using a re-deployment engine and the defined policy, the calculated policy score for the virtual server by relocating the virtual server to a new data center within the distributed network; and (v) creating an alert, if the defined policy is violated by relocating the virtual server.

14 Claims, 2 Drawing Sheets

(56) References Cited

U.S. PATENT DOCUMENTS

| | | | |
|---|---|---|---|
| 2006/0161471 A1* | 7/2006 | Hulen | G06F 17/30592 |
| | | | 705/7.39 |
| 2008/0261701 A1* | 10/2008 | Lewin | G07F 17/32 |
| | | | 463/43 |
| 2011/0061051 A1* | 3/2011 | Haber | G06F 11/3409 |
| | | | 718/100 |
| 2012/0239734 A1* | 9/2012 | Dominick | G06F 9/505 |
| | | | 709/203 |
| 2013/0198797 A1* | 8/2013 | Raghuram | G06F 21/57 |
| | | | 726/1 |
| 2014/0207920 A1 | 7/2014 | Hirana | |
| 2015/0200824 A1* | 7/2015 | Sadovsky | H04L 43/0817 |
| | | | 709/224 |
| 2016/0147549 A1* | 5/2016 | Sivak | G06F 9/45558 |
| | | | 718/1 |

OTHER PUBLICATIONS

Tivoli System Automation; Apr. 27, 2015; http://www-03.ibm.com/software/products/en/tivoli-system-automation.
IBM Platform Resource Scheduler Overview; IBM Cloud Orchestrator on Cloud; Apr. 27, 2015; http://www-01.ibm.com/support/knowledgecenter/SSPSYY/com.ibm.ico.doc_oc/c_prs_installation.html.

\* cited by examiner

SYSTEM AND METHOD FOR POLICY-BASED GEOLOCATION SERVICES FOR VIRTUAL SERVERS

BACKGROUND

The present invention is directed to methods and systems for policy-based optimization of the placement of virtual servers across data centers.

Virtualization is the act of creating a virtual version of a computer system, including for example an operating system, storage device, or other computer resource. Virtualization enables the separation of an image layer, such as an operating system or application, from the underlying hardware platform. Accordingly, images can be freely moved from one physical host to another physical host without significantly affecting the operating system or application.

Modern hosting providers often move images between data centers within their system for a variety of reasons, including for load balancing. Virtualization and load balance is particularly important due to the growing popularity of cloud computing, in which users have access to a shared pool of computing resources.

The geographical location of virtual images or virtual data can be important for several reasons. For example, moving an image from a first location to a second location can change the response time of an application due to network latency changes. As another example, there are often laws, regulations, and/or organization-specific rules about whether data can be stored in a certain country or political unit. Some countries, for example, regulate the transfer or storage of personal information across jurisdictional or geographical boundaries. Examples of these regulations are the European Commission's Directive on Data Protection 95/46/EC and the Swiss Federal Act on Data Protection. As another example, in order to maximize disaster recovery it is often desirable to have data or servers located at different data centers or even within different countries. As yet another example, an organization audit may require exact information about the geographic location of all images, and/or may require a specific organization of all images within the system in order to facilitate the audit.

There are currently methods for the geographic dispersal of a virtualized computer system among multiple servers or storage devices. However, most current methods treat the dispersed servers or storage devices as being equal, without regard for any rules or policy about the distribution.

Accordingly, there is a continued need in the art for automated methods and systems that disperse virtual images or data among devices in multiple locations according to a policy comprising a set of rules.

SUMMARY

The disclosure is directed to inventive methods and systems for policy-based localization of server images and/or data stored on a server within a distributed network. The system validates the current distribution of virtual servers across geographic locations and/or data centers based on a set of custom defined policies. The policies are based on business requirements, such as the need to have a certain server in a certain place or to spread out a set of servers to ensure resilience, among many other possible policies. According to an embodiment, a current server distribution is expressed in a score by calculating the level of adherence to the set of one or more policies. According to an embodiment, the system features mechanisms to improve the alignment of the server distribution to the given policies (i.e. increasing the score) by either providing recommendations for moving servers manually or by automated server relocation.

The term "data" as used here and throughout the specification can include not only data stored on a server, but also server images as well, including but not limited to operating systems, middleware, and applications, among others.

According to an aspect, a method for automated policy-based localization of one or more virtual servers within a distributed network comprising a plurality of data centers includes the steps of: (i) receiving a policy including at least one rule regarding localization of data within the network; (ii) storing the defined policy in a policy database; (iii) calculating, using a policy engine and the defined policy, a current policy score for a virtual server within the distributed network; (iv) optimizing, using a re-deployment engine and the defined policy, the calculated policy score for the virtual server by relocating the virtual server to a different data center within the distributed network; and (v) creating an alert, if the defined policy is violated by relocating the virtual server.

According to an embodiment, the policy score Z is calculated using the formula $$Z = \frac{\sum_{q=1}^{p} W_q * C_q}{\sum_{q=1}^{p} W_q}$$

where $C_q$ is an intermediate policy score for a single policy, $W_q$ is the weight of each policy, and p is the number of policy conditions.

According to an embodiment, the method further includes the steps of: calculating, using the policy engine and the defined policy, a virtual policy score for the virtual server, where the virtual policy score is based at least in part on a mock re-localization of the virtual server to a new data center within the distributed network; comparing, using the policy engine, the calculated policy score to the virtual policy score; and relocating, if the virtual policy score is better than the calculated policy score, the virtual server to the new data center.

According to an embodiment, the step of defining a policy comprises modifying an existing policy.

According to an embodiment, the rule comprises information restricting location of the data, latency of the data, and/or importance of the policy.

According to an embodiment, the method further includes the steps of: comparing, by the policy engine, the defined policy to a pre-existing policy; and creating an alert, if the defined policy and the pre-existing policy are inconsistent.

According to an embodiment, the policy score is calculated as a weighted average.

According to an aspect, a system for automated policy-based localization of a virtual server includes: (i) a plurality of virtual servers distributed among a plurality of data centers within a distributed network; (ii) a policy database comprising one or more defined policies, each of the defined policies comprising at least one rule regarding localization of data within the network; (iii) a policy engine in communication with the policy database and the plurality of virtual servers, wherein the policy engine is configured to calculate, using the one or more defined policies, a policy score for a virtual server within the distributed network; and (iv) a re-deployment engine in communication with the policy engine and the plurality of virtual servers, wherein the policy engine is configured to optimize the policy score by relocating one or more of the virtual servers from a current data center to a different data center within the distributed network.

According to an embodiment, the policy engine is further configured to calculate a virtual policy score for a virtual server within the distributed network, wherein the virtual policy score is based at least in part on a mock re-localization of the virtual server from a current data center to a different data center within the distributed network, and the policy engine is configured to compare the calculated policy score to the virtual policy score; and the re-deployment engine is configured to relocate the virtual server to the different data center within the distributed network if the virtual policy score is better than the calculated policy score.

According to an embodiment, the policy engine is further configured to compare at least one of the one or more defined policies to a pre-existing policy, and is further configured to create an alert if the defined policy and the pre-existing policy are inconsistent.

According to an aspect is a computer program product for automated policy-based localization of a virtual server, the computer program product comprising a computer readable storage medium having program instructions embodied therewith, wherein the computer readable storage medium is not a transitory signal per se, the program instructions readable by a computer to cause the computer to perform a method comprising: (i) storing, by the computer, a defined policy in a policy database, the policy comprising at least one rule regarding localization of data within the network; (ii) calculating, using a policy engine and the defined policy, a current policy score for a virtual server within the distributed network; (iii) optimizing, using a re-deployment engine and the defined policy, the current policy score for the virtual server by relocating the virtual server from the current data center to a different data center within the distributed network; and (iv) creating an alert, if the defined policy is violated by relocation of the virtual server.

According to an embodiment, the computer program product further comprises: calculating, by the computer, a virtual policy score for the virtual server within the distributed network, wherein the virtual policy score is based at least in part on a mock re-localization of the virtual server to a new data center within the distributed network; comparing, by the computer, the calculated policy score to the virtual policy score; and relocating, if the virtual policy score is better than the calculated policy score, the virtual server to the new data center.

These and other aspects of the invention will be apparent from the embodiments described below.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to embodiments of a method and system for policy-based localization of virtual servers within a distributed network. The system validates the current distribution of virtual servers across geographic locations and/or data centers based on a set of custom defined policies. The policies are based on business requirements, such as the need to have a certain server in a certain place or to spread out a set of servers to ensure resilience, among many other possible policies. According to an embodiment, a current server distribution is expressed in a score by calculating the level of adherence to the set of one or more policies. Alarms can be raised in case of existing imminent policy violations. According to an embodiment, the system features mechanisms to improve the alignment of the server distribution to the given policies (i.e. increasing the score) by either providing recommendations for moving servers manually or by automated server relocation.

Figure 1:
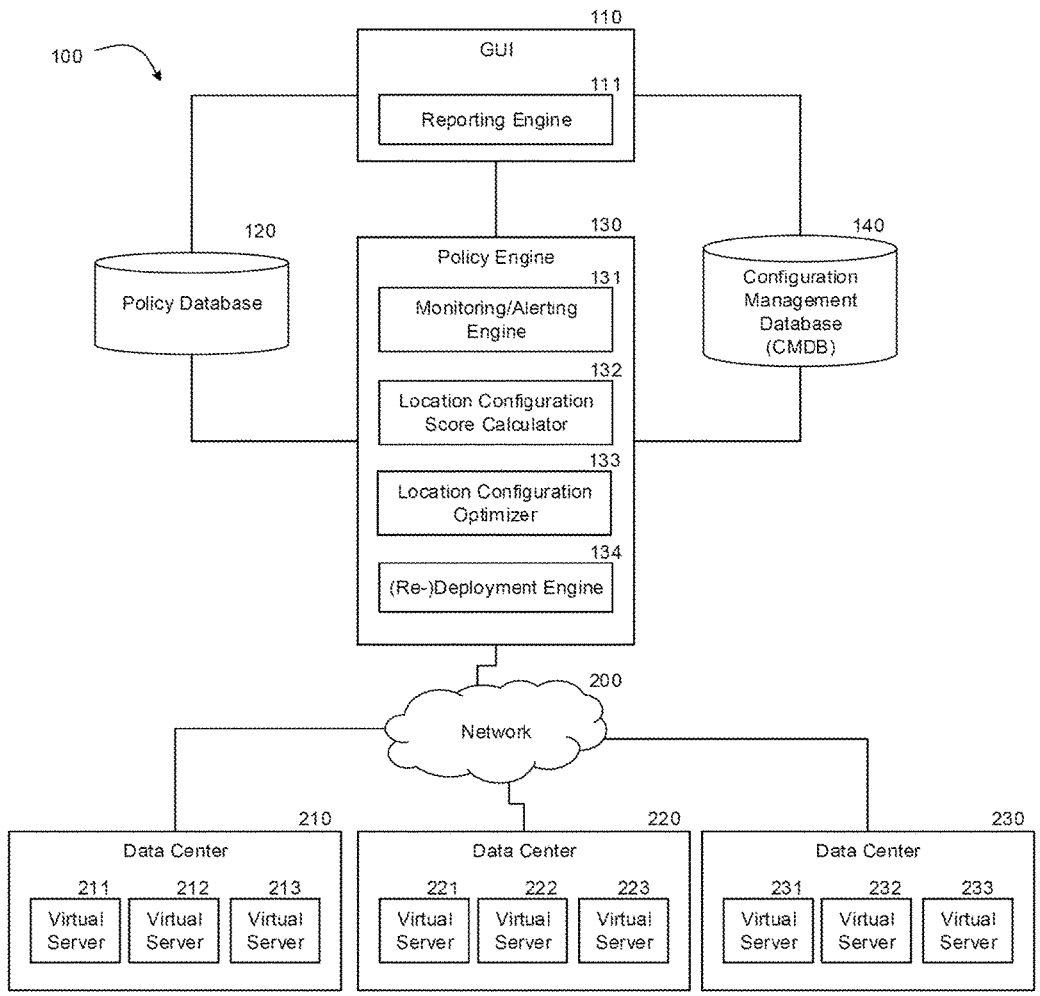
FIG. 1 is a schematic representation of a system for automated policy-based localization of virtual servers within a distributed network, in accordance with an embodiment.

Referring to FIG. 1 is a system 100 for policy-based localization of virtual images or data among multiple devices, in accordance with an embodiment. System 100 includes, for example, a graphical user interface ("GUI") 110, a database 120 containing one or more policies defined by the organization which can impact image localization, a policy engine 130 for evaluating and optimizing distribution of virtual servers across multiple geographical locations (which is called the location configuration), and a Configuration Management Database ("CMDB") 140.

According to an embodiment, an administrator or other user utilizes the GUI 110 to create, define, modify, and/or remove one or more of the policies or rules within the policy database 120. The policy database 120, for example, comprises one or more rules for the localization of virtual images, data, or servers. According to an embodiment, policies can be defined for servers, for groups of servers and generally for all servers.

GUI 110 can also be used to create, access, modify, and/or remove content of the CMDB 140. According to an embodiment, CMDB 140 contains one or more configuration items ("CI") required to validate the policies.

Additionally, the GUI could also be utilized to view status information, such as alerts or other information, generated or gathered by policy engine 130. According to an embodiment, policy engine 130 accesses the policy database 120 and the CMDB 140 and checks at regular intervals the level of alignment of the current location configuration with the one or more active policies. According to an embodiment, a policy change can also trigger the policy engine to recalculate the level of alignment or "score" of the system with the policies.

According to an embodiment, policy engine 130 includes a monitoring/alert engine 131 that creates and communicates an alert to the GUI and/or via one or more customizable interfaces to other communication systems such as email, text, or other systems, if there is a location configuration change or a policy change that results in a violation of one or more policies by the location configuration. The violation can be based, for example, upon a threshold as discussed below in greater detail.

According to an embodiment, policy engine 130 includes a Location Configuration Score Calculator 132 which calculates for each pair—the policy and the actual server location—a score between 0 and 1, provided that the policy is applicable for the server. A score of 0 indicates a violation/mismatch and a score of 1 indicates that the location configuration is in line with the policy. According to an embodiment, the total score is derived by summing up and normalizing the intermediate results, as described in detail below.

According to an embodiment, policy engine 130 includes a Location Configuration Optimizer 133 that performs mock location configuration changes and uses the location configuration score calculator 132 to evaluate whether the mock change improves the score. Optimization can be achieved, for example, using established techniques similar to those developed to solve the classic "travelling salesman" problem. The location configuration optimizer can then send the resulting optimized location configuration to the reporting engine 111 and/or to the re-deployment engine 134 if automated location configuration changes are permitted. According to an embodiment, the reporting engine 111 provides customizable reports containing an alert history, deployment reports, development of the configuration score over time, location configuration optimization performed, and suggested further location configuration changes.

According to an embodiment, policy engine 130 includes a Re-Deployment Engine 134. The Re-Deployment Engine 134 has at least two purposes. For example, the engine deploys one or more new servers matching the one or more policies in an optimal way, such as for example, yielding the highest possible score. Optionally, the Re-Deployment Engine 134 could be allowed to move existing servers to fit in optimally the new server. The Re-Deployment Engine 134 also performs location configuration changes automatically as far as permitted.

The system also comprises a network 200 used for communication between the various data centers 210, 220, and 230, each of which can comprise one or more virtual servers. For example, data center 210 comprises virtual servers 211, 212, and 213; data center 220 comprises virtual servers 221, 222, and 223; and data center 230 comprises virtual servers 231, 232, and 233. Network 200 may be, for example, any wired or wireless communication link, fiber optic cables, or a variety of other possible connections. Indeed, the network may be implemented as one or more of a number of different types of networks, such as, for example, an intranet, a local area network (LAN), a wide area network (WAN), or the internet. Additionally, the system 100 may include additional servers, clients, and other devices not shown to implement processes of illustrative embodiments. The methods and systems described or otherwise envisioned herein are not limited to any particular structure, formulation, or location of the primary environment 100. For example, illustrative embodiments may be implemented within a single data processing system instead of within a network data processing system.

The Policy Database

According to an embodiment, the policy database 120 comprises one or more rules and/or policies that guide, direct, influence, and/or control the distribution of data and images among a distributed and virtualized system. For example, the policy database can comprise one entry for each policy. A policy can comprise, for example, a condition, a scope (such as a set of servers to which the policy is applied), a severity or importance, a weight, and one or more optional parameters. A policy can be defined, for example, for a single server where the scope comprises just one entry or for a group of servers where the scope comprises a list of servers. A policy can also be defined for all servers registered in the CMDB.

Examples of policies are provided below, however these examples demonstrate just a few of the many different types of policies and rules possible.

A policy can optionally comprise information about a particular condition. For example, the condition may be that the virtual image or data must be located within a certain geographical region, country, database, data farm or center, or other location either real or virtual. For example, the policy may set forth the condition that all data be hosted within Canada. The same policy, or a different policy, may set forth the condition that the virtual image or data shall not be located within a certain geographical region, country, database, data farm or center, or other location either real or virtual. For example, the policy may set forth the condition that data may not be hosted within Australia. The same policy, or a different policy, may set forth the condition that the virtual image or data shall only be located within a database or data center with a required parameter such as security level. For example, the policy may set forth the condition that data shall only be hosted in a data center with a specific security rating. The same policy, or a different policy, may set forth the condition that the virtual image or data must be co-localized, or never co-localized, with particular servers or other information. For example, there may be a policy that each server is in a different data center, or that all servers in the scope (see below) must be co-located or must never be co-located.

According to another embodiment, a policy may set forth the condition that the virtual image or data is located such that there is a maximum latency below a certain threshold which may be in seconds, milliseconds, or any other time or speed measurement. For example, there may be a reference location such as a data center or office for which the network latency to a data center(s) is known.

According to another embodiment, a policy may set forth the condition that the virtual image or data requires access to particular data center infrastructure services. This list of services may be information that is defined by and/or stored within the CMDB. Similarly, the policy may set forth the condition that the virtual image or data only be kept at a location where there is available capacity. This information can also be defined by and/or stored within the CMDB.

A policy can optionally comprise information about the one or more server(s) that are covered by the scope of the policy or rule. For example, a server can be defined by a hostname, and that hostname alone or with others can be included in the policy. Thus, a policy may be a hostname, a list of hostnames, or an "all" function.

A policy can optionally comprise information about the severity of the rule or policy. For an "ESSENTIAL" policy, it will be of high importance that the server(s) within the scope of the policy adhere to the policy. Violation of the policy may result in an alert or an alarm. If automated redeployment is allowed, a redeployment engine can try to satisfy the policy even if it reduces the overall score. Likewise, there may be a rule or policy the redeployment engine cannot try to increase the score by violating an essential policy. For an "EXPEDIENT" policy, an alert is only raised when a certain threshold is satisfied. The redeployment engine may violate an expedient policy to increase the overall score, for example.

A policy can optionally comprise information about the weight of a policy, such as a numerical value between 0 and 1. Where a weight is 0, for example, the result of a policy violation may not affect the overall score. However an alarm may be raised regardless, as is defined by the policy and/or by the alarm threshold. Where a weight is 1, for example, the result of a policy violation will significantly impact a score and will always cause an alert or alarm.

A policy can optionally comprise information about one or more additional parameters. For example, there can be a parameter regarding whether an alert is sent for every server violating an expedient policy. There can also be an alert threshold such as a numerical value between 0 and 1 that determines whether an alert is sent.

After a policy has been added or changed, the policy engine checks the complete set of policy for consistency. Namely the policy engine can check whether, for example: (i) a condition requires a server must be located in a specific data center, whilst another condition requires the server not to be in this data center; and/or (ii) a condition requires a server to be collocated with certain other servers, while another condition requires the servers in distinct data centers.

In the event that contradicting policies, rules, or parameters are identified, the user interface 110 can display a warning providing the conflicting conditions, so the administrator can correct them.

The Configuration Management Database

According to an embodiment, the CMDB 140 comprises information that supports the validation of policies and enables automatic server deployment and/or re-deployment. The CMDB comprises, for example, information about servers, data centers, and/or network latency.

For servers, for example, the CMDB can include: (i) server hostname (key); (ii) current server location (data center); (iii) automated redeployment of this server allowed (yes/no); (iv) minimal data center resilience classification required (e.g. Tier III); and/or (v) server resources required (e.g. number of CPU cores, GB RAM, GB disk).

For a data center, for example, the CMDB can include: (i) data center name (key); (ii) country and geographic region; (iii) data center classification in terms of resilience (e.g. Tier III); (iv) infrastructure service available in data center (e.g. print services, Gigabit network); and/or (v) resources currently available (e.g. number of CPU cores, GB RAM, GB disk).

For network latency, for example, the CMDB can include a reference location (key), including for example a list of a data center and information about latency to the data center.

The Policy Engine

According to an embodiment, the policy engine 130 evaluates and optimizes the distribution of virtual servers across multiple geographical locations (which is called the location configuration). The policy engine can do this, for example, in part by calculating a location score. According to an embodiment, the location score can be calculated as a weighted average over a set of validations which result either in true=1 or false=0.

For example, according to an embodiment the following equation is utilized to calculate the intermediate policy score $C_q$ for each policy condition, where the data must be located in a stipulated location:

$$C_q = \frac{1}{n}\sum_{i=1}^{n} \langle \text{current server location}_i = \text{stipulated location} \rangle \quad \text{(Eq. 1)}$$

where n is the number of servers $S_i$ within the scope of the policy (i=1, 2, . . . , n).

According to an embodiment the following equation is utilized to calculate the intermediate policy score $C_q$ for each policy condition, where the data must not be located in a stipulated location:

$$C_q = \frac{1}{n}\sum_{i=1}^{n} 1 - \langle \text{current server location}_i = \text{stipulated location} \rangle \quad \text{(Eq. 2)}$$

According to an embodiment the following equation is utilized to calculate the intermediate policy score $C_q$ for each policy condition, where the data must be located with one or a group of specific servers:

$$C_q = \frac{1}{m}\sum_{k=1}^{m} \frac{1}{n}\sum_{i=1}^{n} \langle \text{current server location}_i = \text{location of reference server}_k \rangle \quad \text{(Eq. 3)}$$

where m is the number of reference servers $R_i$ used in collocation policy (k=1, . . . , m).

According to an embodiment the following equation is utilized to calculate the intermediate policy score $C_q$ for each policy condition, where the data must not be located with one or a group of specific servers:

$$C_q = \frac{1}{m}\sum_{k=1}^{m} \frac{1}{n}\sum_{i=1}^{n} 1 - \langle \text{current server location}_i = \text{location of reference server}_k \rangle \quad \text{(Eq. 4)}$$

According to an embodiment the following equation is utilized to calculate the intermediate policy score $C_q$ for each policy condition, where all servers within the scope of the policy must be co-located:

$$C_q = \frac{2}{n(n-1)}\sum_{k=1}^{n}\sum_{i=k+1}^{n} \langle \text{current server location}_i = \text{current server location}_k \rangle \quad \text{(Eq. 5)}$$

According to an embodiment the following equation is utilized to calculate the intermediate policy score $C_q$ for each policy condition, where the servers and/or data must not be co-located:

$$C_q = \frac{2}{n(n-1)}\sum_{k=1}^{n}\sum_{i=k+1}^{n} 1 - \langle \text{current server location}_i = \text{current server location}_k \rangle \quad \text{(Eq. 6)}$$

According to an embodiment the following equation is utilized to calculate the intermediate policy score $C_q$ for each policy condition, where there is a requirement for a maximum latency to a location:

$$C_q = \frac{1}{n}\sum_{i=1}^{n} \left\langle \begin{array}{l}\text{latency between server location}_i \text{ and} \\ \text{reference location} \leq \text{max.latency}\end{array} \right\rangle \quad \text{(Eq. 7)}$$

According to an embodiment the following equation is utilized to calculate the intermediate policy score $C_q$ for each policy condition, where data center infrastructure services are required:

$$C_q = \frac{1}{s}\sum_{j=1}^{s} \frac{1}{n}\sum_{i=1}^{n} \langle \text{required infrastructure service}_j \in \text{services in current server location}_i\rangle \quad (\text{Eq. 8})$$

where s is the number of infrastructure services required (j=1, ..., s).

According to an embodiment the following equation is utilized to calculate the intermediate policy score $C_q$ for each policy condition, where an available capacity is required:

$$C_q = \frac{1}{c}\sum_{j=1}^{c} \frac{1}{n}\sum_{i=1}^{n} \langle \text{required capacity element}_j \in \text{capacity in current server location}_i\rangle \quad (\text{Eq. 9})$$

where c is the number of capacity elements required (j=1, ..., c).

According to an embodiment, the Total Policy Score Z ($0 \le Z \le 1$) is calculated as a weighted average over the intermediate policy scores Cq using the following formula:

$$Z = \frac{\sum_{q=1}^{p} W_q * C_q}{\sum_{q=1}^{p} W_q} \quad (\text{Eq. 10})$$

where p is the number of policy conditions $P_q$ (q=1, ..., p), and where $W_q$ is the weight ($0 \le W_q \le 1$) of each policy condition $P_q$.

Example 1

According to an example, which is provided solely as an example of the method and does not limit the scope of the invention, an example policy is provided. According to the policy, it is essential that three servers Web1, Web2, and DB1 of a Sales application must be located in the same data center which must have Tier III status. For convenience of the users in Amsterdam, the latency should not exceed 35 ms. All of these elements of the policy must be satisfied.

The statement can be translated to a policy with the following conditions and scope:

C1=all servers must be located in a Tier III data center, where scope is {Web1, Web2, DB1}, severity=essential, weight=1. Additional parameters include: automated redeployment=yes, and alert threshold=0.

C2=all servers in scope must be co-located, where scope is {Web1, Web2, DB1}, severity=essential, weight=0.8. Additional parameters include: automated redeployment=yes, and alert threshold=0.

C3=the maximum latency to Amsterdam is 35 ms, where scope is {Web1, Web2, DB1}, severity=expedient, weight=0.2. Additional parameters include: automated redeployment=yes, alert on each server=no, and alert threshold=0.5.

According to the CMDB, the following information about the system is available: (i) servers Web1 and Web2 are currently located in a Tier III data center in Munich; (ii) latency from the reference location Amsterdam to the data center Munich is 50 ms; (iii) server DB1 is currently located in a Tier II data center in Hamburg; (iv) latency from the reference location Amsterdam to the data center Hamburg is 30 ms; and (v) all three servers can be redeployed automatically to remove policy violations and improve the policy score Z.

For C1=all servers must be located in a Tier III data center:

$$C_1 = \frac{1}{3}\sum_{i=1}^{3} \langle \text{current server location}_i = \text{Tier III datacenter}\rangle = \frac{1}{3}(1 + 1 + 0) = \frac{2}{3}$$

For C2=all servers in scope must be co-located:

$$C_2 = \frac{2}{3(3-1)}\sum_{k=1}^{3}\sum_{i=k+1}^{3} \langle \text{current server location}_i = \text{current server location}_k\rangle =$$

$$\frac{1}{3}\Big(\langle \text{Munich}^{Web1} = \text{Munich}^{Web2}\rangle + \langle \text{Munich}^{Web1} = \text{Hamburg}^{DB1}\rangle +$$

$$\langle \text{Munich}^{Web2} = \text{Hamburg}^{DB1}\rangle\Big) = \frac{1}{3}(1 + 0 + 0) = \frac{1}{3}$$

For C3=the maximum latency to Amsterdam is 35 ms:

$$C_3 = \frac{1}{3}\sum_{i=1}^{3} \langle \text{latency between server location}_i \text{ and Amsterdam} \le 35 \text{ ms}\rangle =$$

$$\frac{1}{3}(\langle 50 \text{ ms}^{Web1} \le 35 \text{ ms}\rangle + \langle 50 \text{ ms}^{Web2} \le 35 \text{ ms}\rangle +$$

$$\langle 30 \text{ ms}^{DB1} \le 35 \text{ ms}\rangle) = \frac{1}{3}(0 + 0 + 1) = \frac{1}{3}$$

The total policy score Z is calculated with the given weights $W_1=1$, $W_2=0.8$, and $W_3=0.2$:

$$Z = \frac{\sum_{q=1}^{3} W_q * C_q}{\sum_{q=1}^{3} W_q} = \frac{1*\frac{2}{3} + 0.8*\frac{1}{3} + 0.2*\frac{1}{3}}{1 + 0.8 + 0.2} = \frac{1}{2} = 50\%$$

An alarm is raised for server DB1 since two essential policy conditions C1 and C2 are not satisfied, the location in a Tier III and the collocation with the two web servers. Also an alarm as the latency condition C3 is not met for two out of three servers as the threshold in C3 was set to 0.5.

As all servers have the automatic redeployment flag set in the CMDB, the redeployment engine will try to improve the location configuration. Aligning the configuration to essential policies (i.e. removing alerts due to violation of essential policies) has precedence over fixing expedient policy violations and over raising the total policy score.

In the example, moving the two web servers from Munich Tier III data center to Hamburg Tier II data center to co-locate the servers to satisfy the latency conditions would not be an option for the redeployment engine, since the location change would cause new alerts due to essential policy violation.

In case there is no Tier III data center available in the range of 30 ms latency around Amsterdam and assuming there is spare hosting capacity in Munich, the redeployment engine would relocate the server DB1 from Hamburg to Munich since this action removes the violations of essential policies. Moreover the total policy score is increased:

$$Z = \frac{1*\frac{3}{3} + 0.8*\frac{3}{3} + 0.2*\frac{0}{3}}{1 + 0.8 + 0.2} = 90\%$$

The Location Configuration Optimizer

The operation with the highest precedence for the Location Configuration Optimizer 133 is to align the current location configuration with the essential policies. The Optimizer will not create a location change which induces an additional violation of an essential policy to fix one or more violations of essential policies, i.e. a trading of essential policy violations is not done. However, changes causing violations of expedient policies are accepted to align the configuration with an essential policy.

After dealing with removals of essential policy violations, the Optimizer tries to optimize the total policy score. As above, changes to create an essential policy violation is not permitted.

All changes are subject to the availability of capacity in the data centers. As the required capacity for each virtual server and the available capacity in the data center is stored in the CMDB, the policy engine validates a potential location change under the aspect of capacity.

In case the server has the automated re-deployment flag set to yes, change requests are submitted to the (Re-) Deployment Engine 134 and will be listed in the report. In case automated server re-deployment is disabled, the change requests appear only in the report as recommendations. Automated changes appear also in the report allowing the administrators to keep track. Before an automated action is executed the policy checks whether a contrary action was performed recently. This is necessary to avoid flip-flop effects which could be caused by minor score fluctuations.

Figure 2:
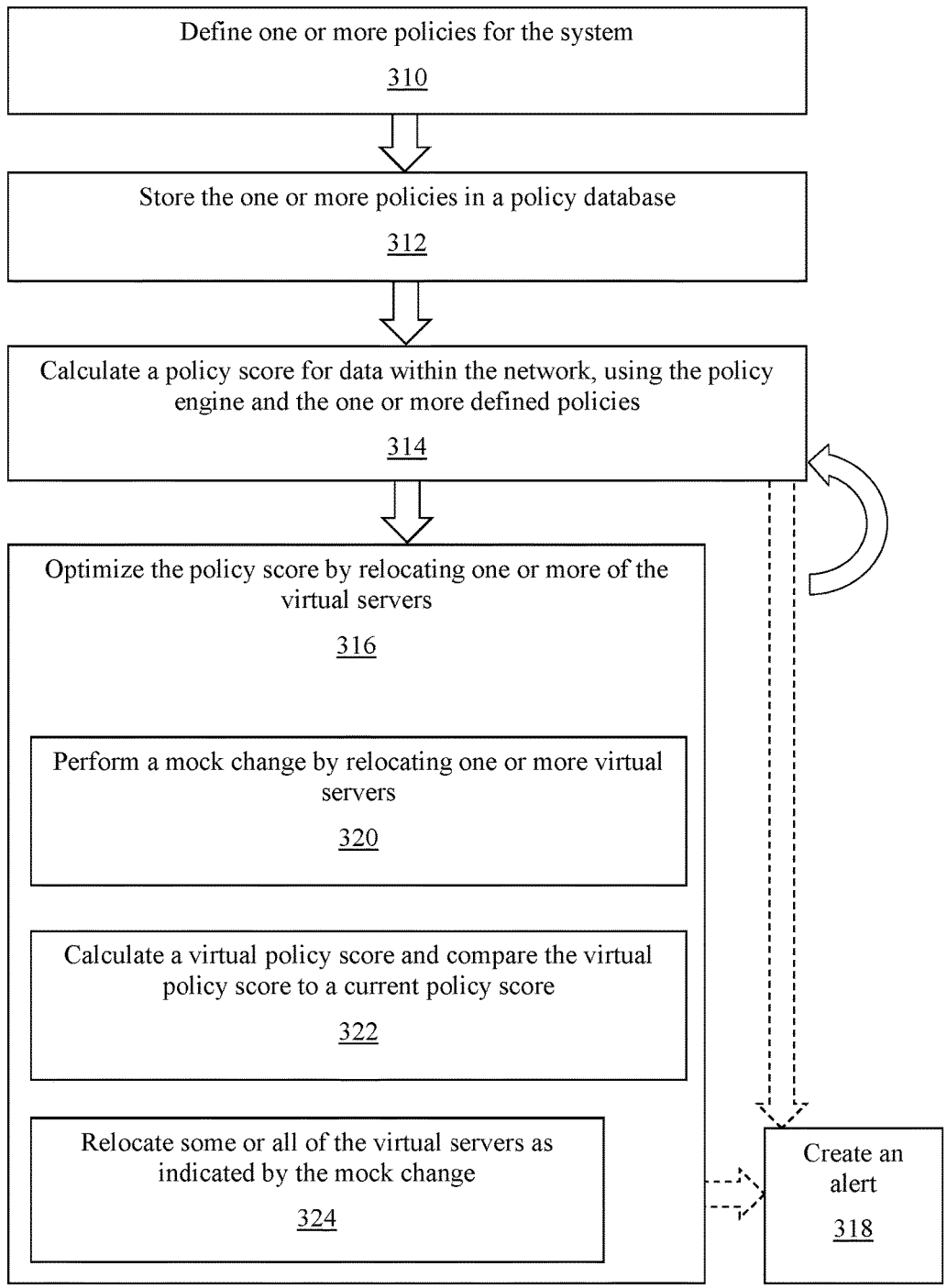
FIG. 2 is a flow chart of a method for automated policy-based localization of virtual servers within a distributed network, in accordance with an embodiment.

Referring to FIG. 2 is a flow chart of a method 300 for automated policy-based localization of server resources in a distributed wide area network system 100, in accordance with an embodiment. The method utilizes one or more embodiments of the systems described or otherwise envisioned herein. For example, the network can comprise a plurality of data centers, virtual servers, data, and other resources for storing and streaming to requesting clients. System 100 includes, for example, a graphical user interface ("GUI") 110, a database 120 containing one or more policies defined by the organization which can impact image localization, a policy engine 130 for evaluating and optimizing distribution of virtual servers across multiple geographical locations (which is called the location configuration), and a Configuration Management Database ("CMDB") 140.

At step 310 of the method, one or more policies are defined, where the one or more policies include one or more rules for the system. According to an embodiment, an administrator or other user can use the GUI 110 to create, define, modify, and/or remove one or more of the policies or rules within the policy database 120. According to an embodiment, policies can be defined for servers, for groups of servers and generally for all servers.

At step 312 of the method, the one or more defined policies are stored, updated, or removed from a policy database 120. The policy database 120, for example, comprises one or more rules for the localization of virtual images, data, or servers.

At step 314, the policy engine uses the one or more defined policies to calculate a policy score for virtual images and data within the distributed network, and raises one or more alerts if required. According to an embodiment, policy engine 130 accesses the policy database 120 and the CMDB 140 and checks at regular intervals the level of alignment of the current location configuration with the one or more active policies. According to an embodiment, the CMDB 140 comprises information that supports the validation of policies and enables automatic server deployment and/or re-deployment. The CMDB comprises, for example, information about servers, data centers, and/or network latency.

At step 316 of the method, the policy score is optimized using the Re-Deployment Engine 134 and the one or more defined policies, where some or all of the virtual images servers are relocated to a different server within the distributed network. For example, the engine deploys one or more new servers matching the one or more policies in an optimal way, such as for example, yielding the highest possible score. Optionally, the Re-Deployment Engine 134 could be allowed to move existing servers to fit in optimally the new server. The Re-Deployment Engine 134 also performs location configuration changes automatically as far as permitted.

For example, according to an embodiment, at step 320 of the method, the calculated policy score can trigger Re-Deployment Engine 134 to relocate some or all of the virtual servers, or to calculate or perform a relocation that will ultimately improve the policy score.

At optional step 318 of the method, an alert can be created. According to an embodiment, the system includes a monitoring/alert engine 131 that creates and communicates an alert to the GUI and/or via one or more customizable interfaces to other communication systems such as email, text, or other systems, if there is a location configuration change or a policy change that results in a violation of one or more policies by the location configuration. The violation can be based, for example, upon a threshold as discussed below in greater detail.

At step 322 of the method, the Location Configuration Optimizer 133 of the policy engine 130 calculates a virtual policy score for a server within the distributed network. According to an embodiment, policy engine 130 includes a Location Configuration Optimizer 133 that performs mock location configuration changes, creates a virtual policy score, and uses the location configuration score calculator 132 to evaluate whether the mock change improves the score. Optimization can be achieved, for example, using established techniques similar to those developed to solve the classic "travelling salesman" problem. The location configuration optimizer can then send the resulting optimized location configuration to the reporting engine 111 and/or to the re-deployment engine 134 if automated location configuration changes are permitted. According to an embodiment, reporting engine 111 provides customizable reports containing an alert history, deployment reports, development of the configuration score over time, location configuration optimization performed, and suggested further location configuration changes.

Accordingly, at step 322 of the method, the policy engine 130 compares the virtual policy score to a current policy score such as the one calculated in step 314, and determines whether the mock location configuration would improve the policy score. If so, the method proceeds to step 324. If the mock location configuration would not improve the policy score, the method can return to step 320 or any of the other steps.

According to an embodiment, a policy change can also trigger the policy engine to recalculate the level of alignment or "score" of the system with the policies. According to an embodiment, the system includes a monitoring/alert engine 131 that creates and communicates an alert to the GUI and/or via one or more customizable interfaces to other communication systems such as email, text, or other systems, if there is a location configuration change or a policy change that results in a violation of one or more policies by the location configuration. The violation can be based, for example, upon a threshold as discussed below in greater detail.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automated policy-based localization of one or more virtual servers within a distributed network comprising a plurality of data centers, the method comprising the steps of:
    receiving a policy, the policy comprising at least one rule regarding localization of at least one virtual server within the network, the at least one rule specifying a latency threshold for data stored in the at least one virtual server;
    creating an alert, if the received policy violates a pre-existing policy of the distributed network;
    storing the received policy in a policy database;
    calculating, using a policy engine and the received policy, a current policy score for the at least one virtual server, wherein the policy score is calculated as a weighted average;
    calculating, using the policy engine and the received policy, a virtual policy score for the at least one virtual server, wherein the virtual policy score is based at least in part on a mock re-localization of a virtual server to a new data center within the distributed network;
    comparing, using the policy engine, the calculated policy score to the virtual policy score; and
    optimizing, using a re-deployment engine and the received policy, the calculated policy score for the virtual server by relocating the virtual server to a different data center within the distributed network if the virtual policy score is better than the calculated policy score;
    creating an alert, if the received policy is violated by relocating the virtual server; and
    creating a report comprising an alert history, deployment information, and a history of the calculated policy score over time.

2. The method of claim 1, wherein the policy score Z is calculated using the formula $$Z = \frac{\sum_{q=1}^{p} W_q * C_q}{\sum_{q=1}^{p} W_q}$$

where $C_q$ is an intermediate policy score for a single policy, $W_q$ is the weight of each policy, and p is the number of policy conditions.

3. The method of claim 1, wherein the step of receiving a policy comprises modifying an existing policy.

4. The method of claim 1, wherein the at least one rule comprises information restricting location of data stored in the one or more virtual servers.

5. The method of claim 1, wherein the at least one rule comprises information regarding importance of the policy.

6. The method of claim 1, further comprising the steps of:
    comparing, by the policy engine, the received policy to a pre-existing policy.

7. A system for automated policy-based localization of at least one virtual server, the system comprising:
    a plurality of virtual servers distributed among a plurality of data centers within a distributed network;
    a policy database comprising one or more defined policies, each of the defined policies comprising at least one rule regarding localization of at least one of the plurality of virtual servers within the network, the at least one rule specifying a latency threshold for data stored in the at least one of the plurality of virtual servers within the network; and
    a hardware processor comprising:
        a policy engine in communication with the policy database and the plurality of virtual servers, wherein the policy engine is configured to: (i) calculate, using the one or more defined policies, a policy score for the at least one of the plurality of virtual servers within the distributed network; (ii) calculate, using the defined policy, a virtual policy score for the at least one virtual server, wherein the virtual policy score is based at least in part on a mock re-localization of a virtual server to a new data center within the distributed network; and (ii) compare the calculated policy score to the virtual policy score;
        a re-deployment engine in communication with the policy engine and the plurality of virtual servers, wherein the policy engine is configured to optimize the policy score by relocating one or more of the virtual servers from a first data center to a second data center within the distributed network if the virtual policy score is better than the calculated policy score;
        an alert engine configured to create an alert when either: (i) the received policy violates a pre-existing policy of the distributed network; or (ii) the received policy is violated by relocating the virtual server; and
        a reporting engine configured to create a report comprising an alert history, deployment information, and a history of the calculated policy score over time.

8. The system of claim 7, wherein the policy engine is configured to calculate the policy score Z using the formula $$Z = \frac{\sum_{q=1}^{p} W_q * C_q}{\sum_{q=1}^{p} W_q}$$

where $C_q$ is an intermediate policy score for a single policy, $W_q$ is the weight of each policy, and p is the number of policy conditions.

9. The system of claim 7, wherein the policy engine is further configured to compare at least one of the one or more defined policies to a pre-existing policy.

10. The system of claim 7, wherein the policy score is calculated as a weighted average.

11. The system of claim 7, wherein the rule comprises information restricting location of the data.

12. The system of claim 7, wherein the rule comprises information regarding importance of the policy.

13. A computer program product for automated policy-based localization of a virtual server, the computer program product comprising a computer readable storage medium having program instructions embodied therewith, wherein the computer readable storage medium is not a transitory signal per se, the program instructions readable by a computer to cause the computer to perform a method comprising:

storing, by the computer, a defined policy in a policy database, the policy comprising at least one rule regarding localization of certain data within the network, the at least one rule specifying a latency threshold for the certain data;

creating an alert, if the stored policy violates a pre-existing policy of the distributed network;

calculating, using a policy engine and the defined policy, a current policy score for a virtual server within the distributed network;

calculating, using the policy engine and the defined policy, a virtual policy score for the at least one virtual server, wherein the virtual policy score is based at least in part on a mock re-localization of a virtual server to a new data center within the distributed network;

comparing, using the policy engine, the calculated policy score to the virtual policy score; and optimizing, using a re-deployment engine and the defined policy, the current policy score for the virtual server by relocating the virtual server from the current data center to a different data center within the distributed network if the virtual policy score is better than the calculated policy score; and creating an alert, if the defined policy is violated by relocation of the virtual server; and creating a report comprising an alert history, deployment information, and a history of the calculated policy score over time.

14. The computer program product of claim 13, wherein the policy score Z is calculated using the formula $$Z = \frac{\sum_{q=1}^{p} W_q * C_q}{\sum_{q=1}^{p} W_q}$$

where $C_q$ is an intermediate policy score for a single policy, $W_q$ is the weight of each policy, and p is the number of policy conditions.

\* \* \* \* \*